(12) United States Patent
Sutskever et al.

(10) Patent No.: US 9,805,028 B1
(45) Date of Patent: Oct. 31, 2017

(54) TRANSLATING TERMS USING NUMERIC REPRESENTATIONS

(71) Applicant: Google Inc., Mountain View, CA (US)

(72) Inventors: Ilya Sutskever, Mountain View, CA (US); Tomas Mikolov, Jersey City, NJ (US); Jeffrey Adgate Dean, Palo Alto, CA (US); Quoc V. Le, Mountain View, CA (US)

(73) Assignee: Google Inc., Mountain View, CA (US)

( * ) Notice: Subject to any disclaimer, the term of this patent is extended or adjusted under 35 U.S.C. 154(b) by 54 days.

(21) Appl. No.: 14/857,709

(22) Filed: Sep. 17, 2015

Related U.S. Application Data

(60) Provisional application No. 62/051,435, filed on Sep. 17, 2014.

(51) Int. Cl.
*G06F 17/20* (2006.01)
*G06F 17/27* (2006.01)
*G06F 17/28* (2006.01)

(52) U.S. Cl.
CPC ............ *G06F 17/289* (2013.01); *G06F 17/20* (2013.01); *G06F 17/27* (2013.01); *G06F 17/275* (2013.01); *G06F 17/2785* (2013.01); *G06F 17/28* (2013.01); *G06F 17/2818* (2013.01); *G06F 17/2836* (2013.01); *G06F 17/2854* (2013.01); *G06F 17/274* (2013.01)

(58) Field of Classification Search
CPC combination set(s) only.
See application file for complete search history.

(56) References Cited

U.S. PATENT DOCUMENTS

| 4,635,199 | A | * | 1/1987 | Muraki | G06F 17/2872 434/157 |
| 5,426,583 | A | * | 6/1995 | Uribe-Echebarria Diaz De Mendibil | G06F 17/271 704/2 |
| 5,442,546 | A | * | 8/1995 | Kaji | G06F 17/2827 704/4 |

(Continued)

OTHER PUBLICATIONS

Haghighi et al., "Learning Bilingual Lexicons from Monolingual Corpora," (2008) [online] (retrieved from http://nlp.cs.berkeley.edu/pubs/Haghighi-Liang-BergKirkpatrick-Klein_2008_Lexicons_paper.pdf) 9 pages.

(Continued)

*Primary Examiner* — Pierre-Louis Desir
*Assistant Examiner* — David Kovacek
(74) *Attorney, Agent, or Firm* — Fish & Richardson P.C.

(57) ABSTRACT

Methods, systems, and apparatus, including computer programs encoded on computer storage media, for translating terms using numeric representations. One of the methods includes obtaining data that associates each term in a vocabulary of terms in a first language with a respective high-dimensional representation of the term; obtaining data that associates each term in a vocabulary of terms in a second language with a respective high-dimensional representation of the term; receiving a first language term; and determining a translation into the second language of the first language term from the high-dimensional representation of the first language term and the high-dimensional representations of terms in the vocabulary of terms in the second language.

16 Claims, 4 Drawing Sheets

(56) References Cited

U.S. PATENT DOCUMENTS

| | | | | | |
|---|---|---|---|---|---|
| 5,477,451 | A | * | 12/1995 | Brown | G06F 17/2755 704/2 |
| 5,523,946 | A | * | 6/1996 | Kaplan | G06F 17/2735 704/2 |
| 5,724,593 | A | * | 3/1998 | Hargrave, III | G06F 17/2827 704/7 |
| 5,848,389 | A | * | 12/1998 | Asano | G10L 15/18 704/239 |
| 6,275,789 | B1 | * | 8/2001 | Moser | G06F 17/271 704/2 |
| 6,463,404 | B1 | * | 10/2002 | Appleby | G06F 17/2785 704/2 |
| 6,490,548 | B1 | * | 12/2002 | Engel | G06F 17/2735 704/10 |
| 6,937,974 | B1 | * | 8/2005 | d'Agostini | G06F 17/2818 704/2 |
| 7,702,673 | B2 | * | 4/2010 | Hull | G06F 17/30247 707/707 |
| 8,135,575 | B1 | * | 3/2012 | Dean | G06F 17/2845 704/2 |
| 8,706,472 | B2 | * | 4/2014 | Ramerth | G06F 17/2863 704/2 |
| 8,775,341 | B1 | * | 7/2014 | Commons | G06N 3/0454 706/20 |
| 8,825,648 | B2 | * | 9/2014 | Ni | G06F 17/277 704/7 |
| 9,262,406 | B1 | * | 2/2016 | Das | G06F 17/289 |
| 9,323,746 | B2 | * | 4/2016 | Bangalore | G06F 17/2836 |
| 2003/0126559 | A1 | * | 7/2003 | Fuhrmann | G06F 17/28 715/229 |
| 2003/0191643 | A1 | * | 10/2003 | Belenger | G10L 15/005 704/254 |
| 2003/0216919 | A1 | * | 11/2003 | Roushar | G06F 17/277 704/260 |
| 2004/0122656 | A1 | * | 6/2004 | Abir | G06F 17/2872 704/4 |
| 2004/0158561 | A1 | * | 8/2004 | Gruenwald | G06F 17/2872 |
| 2005/0055217 | A1 | * | 3/2005 | Sumita | G06F 17/2827 704/277 |
| 2005/0102130 | A1 | * | 5/2005 | Quirk | G06F 17/28 704/4 |
| 2005/0143971 | A1 | * | 6/2005 | Burstein | G06F 17/274 704/4 |
| 2005/0273315 | A1 | * | 12/2005 | Laitila | G06F 8/51 704/9 |
| 2006/0095248 | A1 | * | 5/2006 | Menezes | G06F 17/2818 704/3 |
| 2006/0265209 | A1 | * | 11/2006 | Bradford | G06F 17/2809 704/9 |
| 2007/0061152 | A1 | * | 3/2007 | Doi | G10L 15/26 704/277 |
| 2007/0083359 | A1 | * | 4/2007 | Bender | G06F 17/2785 704/9 |
| 2008/0306727 | A1 | * | 12/2008 | Thurmair | G06F 17/2818 704/4 |
| 2008/0319735 | A1 | * | 12/2008 | Kambhatla | G06F 17/277 704/9 |
| 2009/0119090 | A1 | * | 5/2009 | Niu | G06F 17/24 704/1 |
| 2009/0204401 | A1 | * | 8/2009 | Bu | G10L 13/10 704/260 |
| 2010/0023311 | A1 | * | 1/2010 | Subrahmanian | G06F 17/275 704/2 |
| 2010/0204981 | A1 | * | 8/2010 | Ribeiro | G06F 17/289 704/8 |
| 2010/0324909 | A1 | * | 12/2010 | Runge | H04M 3/5307 704/270 |
| 2011/0184718 | A1 | * | 7/2011 | Chen | G06F 17/2872 704/2 |
| 2011/0314006 | A1 | * | 12/2011 | Sweeney | G06F 17/2785 707/723 |
| 2012/0323554 | A1 | * | 12/2012 | Hopkins | G06F 17/2818 704/2 |
| 2013/0289970 | A1 | * | 10/2013 | Liebermann | G06F 17/28 704/2 |
| 2014/0257794 | A1 | * | 9/2014 | Gandrabur | G10L 15/1815 704/9 |
| 2014/0280072 | A1 | * | 9/2014 | Coleman | G06F 17/30554 707/722 |
| 2014/0309990 | A1 | * | 10/2014 | Gandrabur | G10L 15/1815 704/9 |
| 2014/0358519 | A1 | * | 12/2014 | Mirkin | G06F 17/2854 704/3 |
| 2015/0058019 | A1 | * | 2/2015 | Chen | G10L 13/10 704/260 |

OTHER PUBLICATIONS

Koehn and Knight, "Learning a Translation Lexicon from Monolingual Corpora," (2002) [online] (retrieved from http://www.aclweb.org/anthology/W02-0902.pdf), 8 pages.

Mikolov et al., "Efficient Estimation of Word Representations in Vector Space," (2013) [online] (retrieved from http://arxiv.org/pdf/1301.3781v3.pdf), 12 pages.

* cited by examiner

TRANSLATING TERMS USING NUMERIC REPRESENTATIONS

CROSS-REFERENCE TO RELATED APPLICATION

This application claims priority to U.S. Provisional Application No. 62/051,435, filed on Sep. 17, 2014. The disclosure of the prior application is considered part of and is incorporated by reference in the disclosure of this application.

BACKGROUND

This specification relates to translating terms from a source language into a target language using numeric representations of terms in the source language and numeric representations of terms in the target language.

Machine translation systems can use various techniques in an attempt to translate words from a source language to a target language. For example, some machine translation systems use dictionaries to translate a term from a source language into the target language.

SUMMARY

This specification generally describes how a system implemented as computer programs on one or more computers in one or more locations can generate translations of terms in a vocabulary of terms from one language to another.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a translation system that generates translations of terms in a vocabulary of terms in a source language into a target language. Generally, the translation system generates the translations of the terms using high-dimensional representations of the terms in the vocabulary and high-dimensional representations of terms in a vocabulary of terms in the target language.

Figure 1:
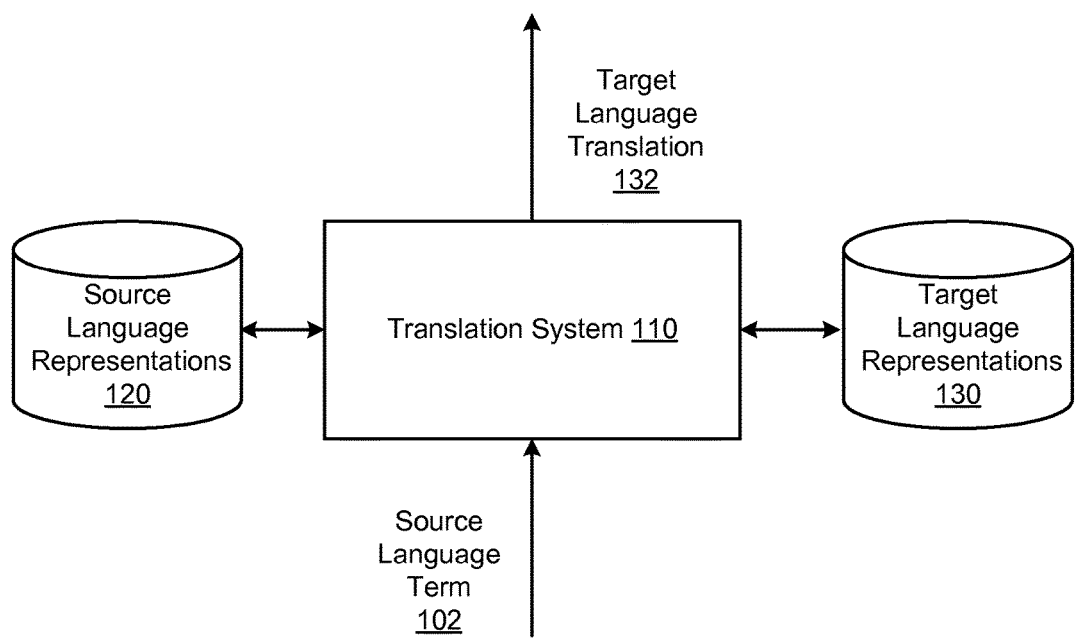
FIG. 1 shows an example translation system.

FIG. 1 shows an example translation system 100. The translation system 100 is an example of a system implemented as computer programs on one or more computers in one or more locations, in which the systems, components, and techniques described below can be implemented.

The translation system 100 receives a term in a source language, e.g., a source language term 102, and generates a translation of the source language term into a target language, e.g., a target language translation 132 of the source language term 102. In particular, the translation system generates the translation using high-dimensional representations of source language terms in a source language representations data store 120 and high-dimensional representations of target language terms in target language representation data store 130.

The source language representations data store 120 stores data that associates each term in a vocabulary of terms in the source language with a respective high-dimensional representation of the term. A high-dimensional representation of a term is a numeric representation, e.g., a vector of numeric values, of the term in a high-dimensional space.

The target language representations data store 130 stores data that associates each term in a vocabulary of terms in the target language with a respective high-dimensional representation of the term.

Generally, the associations for a given language are generated so that the relative locations of terms in the vocabulary of terms in the given language reflect semantic and syntactic similarities between the terms in the given language. That is, the relative locations of terms in the high-dimensional space reflect syntactic similarities between the terms, e.g., showing that, by virtue of their relative location in the space, words that are similar to the word "he" may include the words "they," "me," "you," and so on, and semantic similarities, e.g., showing that, by virtue of their relative locations in the space the word "queen" is similar to the words "king" and "prince." Furthermore, relative locations in the space may show that the word "king" is similar to the word "queen" in the same sense as the word "prince" is similar to the word "princess," and, in addition, that the word "king" is similar to the word "prince" as the word "queen" is similar to the word "princess."

Additionally, in some implementations, operations can be performed on the locations to identify words that have a desired relationship to other words. In particular, vector subtraction and vector addition operations performed on the locations can be used to determine relationships between words. For example, in order to identify a word X that has a similar relationship to a word A as a word B has to a word C, the following operation may be performed on the vectors representing words A, B, and C: vector(B)−vector(C)+vector(A). For example, the operation vector("Man")−vector("Woman")+vector("Queen") may result in a vector that is close to the vector representation of the word "King."

Associations of terms to high-dimensional vector representations having these characteristics can be generated by training a machine learning system configured to process each term in the vocabulary of terms in a given language to obtain a respective numeric representation of each term in the vocabulary in the high-dimensional space and to associate each term in the vocabulary with the respective numeric representation of the term in the high-dimensional space. Example techniques for training such a system and generating the associations for a given language are described in Tomas Mikolov, Kai Chen, Greg S. Corrado, and Jeffrey Dean, *Efficient estimation of word representations in vector space*, International Conference on Learning Representations (ICLR), Scottsdale, Ariz., USA, 2013.

Generating a translation for a source language term using high-dimensional representations of terms is described in more detail below with reference to FIGS. 2 and 3.

Figure 2:
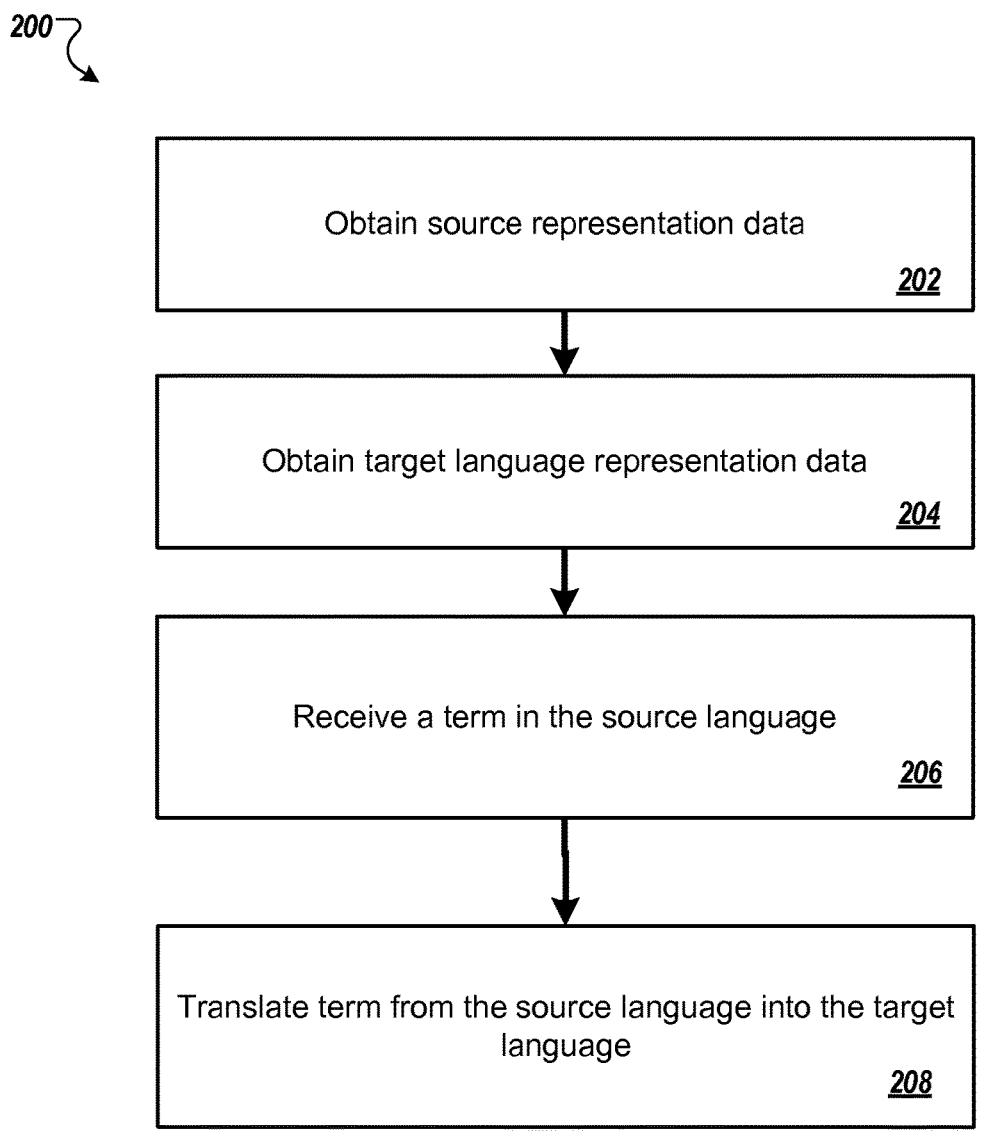
FIG. 2 is a flow diagram of an example process for generating a translation of a source language term into a target language.

FIG. 2 is a flow diagram of an example process 200 for generating a translation for a term in the source language. For convenience, the process 200 will be described as being performed by a system of one or more computers located in one or more locations. For example, a translation system, e.g., the translation system 100 of FIG. 1, appropriately programmed, can perform the process 200.

The system obtains source language representation data (step 202). The source language representation data associates each term in a vocabulary of terms in the source language with a respective high-dimensional representation of the term. A high-dimensional representation of a term is a numeric representation, e.g., a vector of numeric values, of the term in a high-dimensional space.

The system obtains target language representation data (step 204). The target language representation data associates each term in a vocabulary of terms in the target language with a respective high-dimensional representation of the term.

The system receives a source language term, i.e., a term in the source language (step 206). The source language term is one of the terms in the vocabulary of terms in the source language that are each associated with a respective high-dimensional representation.

The system translates the source language term from the source language into the target language using the high-dimensional representation of the source language term and the target language representation data (step 208). Using high-dimensional representations to generate a translation of the source language term is described in more detail below with reference to FIG. 3.

Figure 3:
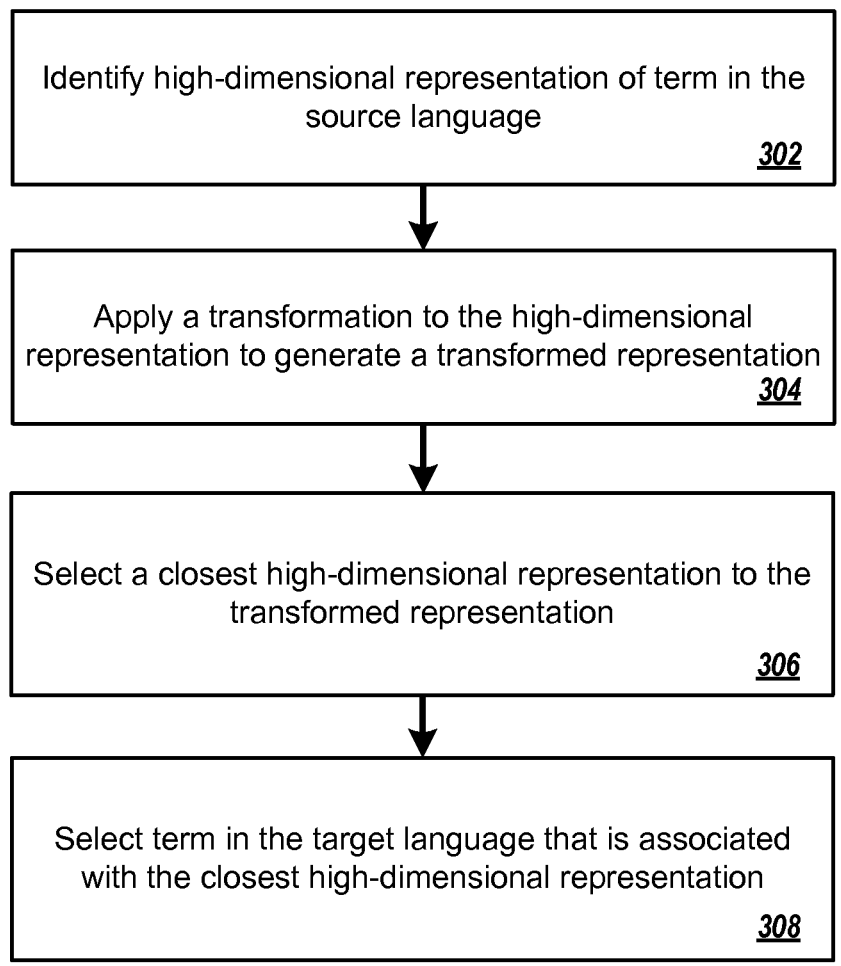
FIG. 3 is a flow diagram of an example process for using high-dimensional representations to generate a translation of a source language term.

FIG. 3 is a flow diagram of an example process 300 for using high-dimensional representations to generate a translation of a source language term. For convenience, the process 300 will be described as being performed by a system of one or more computers located in one or more locations. For example, a translation system, e.g., the translation system 100 of FIG. 1, appropriately programmed, can perform the process 300.

The system identifies, using the source language representation data, a high-dimensional representation of the source language term (step 302).

The system applies a transformation to the identified high-dimensional representation to generate a transformed representation (step 304). Generally, the system applies the transformation in accordance with trained values of a set of parameters. In some implementations, the transformed representation z satisfies $z=Wx$, with W being a matrix of the trained values of the set of parameters and x being the high-dimensional representation of the term in the source language. Determining the trained values of the parameters is described in more detail below with reference to FIG. 4.

The system selects, from the high-dimensional representations of the terms in the vocabulary of terms in the target language identified in the target language representation data, the closest high-dimensional representation to the transformed representation (step 306). That is, the system selects the closest high-dimensional representation to the transformed representation that is associated with a term in the target language. In some implementations, the system selects the high-dimensional representation having the largest cosine similarity with the representation of the source language term of any of the representations that are associated with terms in the target language as the closest high-dimensional representation.

The system selects the term in the target language that is associated with the closest high-dimensional representation as the translation of the source language term into the target language (step 308).

In some implementations, the system also uses the largest cosine similarity value as a confidence score for the translation of the term and determines that the translation of the source language term into the target language is valid only when the confidence score exceeds a threshold value. If the translation is determined to not be valid, the system can skip translating the source language term.

In some implementations, the system can perform the processes 200 and 300 to determine whether an existing translation of the source language term, e.g., in a dictionary or other translation service, is likely correct or incorrect. In particular, the system can perform the processes 200 and 300 to select a translation of the source language term into the target language. The system can then determine a distance, e.g., a cosine similarity, between the high-dimensional representation of the selected translation and a high-dimensional representation of the existing translation of the source language term into the second language of the term in the first language. The system can then classify the existing translation as either likely correct or likely incorrect based on the distance. For example, when the distance metric is cosine similarity, the system can determine that the existing translation is likely correct when the cosine similarity exceeds a threshold value and likely incorrect when the cosine similarity does not exceed the threshold value.

Figure 4:
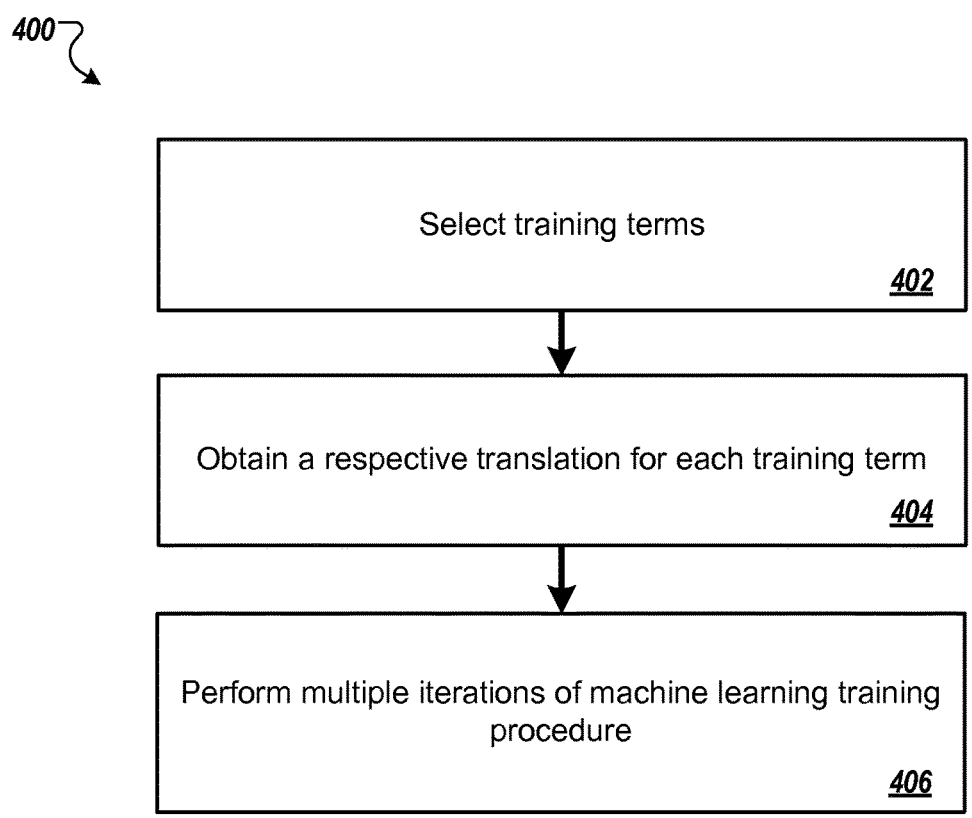
FIG. 4 is a flow diagram of an example process for determining trained values of a set of transformation parameters.

FIG. 4 is a flow diagram of an example process 400 for determining trained values of a set of transformation parameters. For convenience, the process 400 will be described as being performed by a system of one or more computers located in one or more locations. For example, a translation system, e.g., the translation system 100 of FIG. 1, appropriately programmed, can perform the process 400.

The system selects a set of training terms in the source language (step 402). In some implementations, the system selects a pre-determined number of most frequently occurring terms from the vocabulary of terms in the source language as the training terms.

The system obtains a respective translation of each training term (step 404). In particular, the system obtains a translation into the target language for each of the training terms from a translation service, e.g., an online dictionary or online machine translation service.

The system performs multiple iterations of a machine learning training procedure to determine trained values of the transformation parameters from initial values of the translation parameters using the training terms and the translations of the training terms as training data (step 406). In particular, the system performs the machine learning training procedure, e.g., stochastic gradient descent, to determine a matrix of values W that satisfies:

$$\min_{W} \sum_{i=1}^{n} \|Wx_i - z_i\|^2$$

where n is the total number of training terms, $x_i$ is the high-dimensional representation of an i-th training term in the source language, and $z_i$ is the high-dimensional representation of the translation into the target language of the i-th training term.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
  maintaining data that associates each term in a vocabulary of terms in a first language with a respective high-dimensional representation of the term, wherein the high-dimensional representation of the term is a numeric representation of the term in a high-dimensional space, and wherein positions of high-dimensional representations of terms from the vocabulary of terms in the first language in the high-dimensional space reflect syntactic similarities, semantic similarities, or both between the terms from the vocabulary of terms in the first language;
  maintaining data that associates each term in a vocabulary of terms in a second language with a respective high-dimensional representation of the term, wherein the high-dimensional representation of the term is a numeric representation of the term in the high-dimensional space, and wherein positions of high-dimensional representations of terms from the vocabulary of terms in the second language in the high-dimensional space reflect syntactic similarities, semantic similarities, or both between the terms from the vocabulary of terms in the second language;
  receiving a first language term, wherein the first language term is a term from the vocabulary of terms in the first language; and
  determining a translation into the second language of the first language term from the high-dimensional representation of the first language term and the high-dimensional representations of terms in the vocabulary of terms in the second language, wherein determining the translation into the second language of the first language term comprises:
    identifying a high-dimensional representation of the first language term;
    applying a transformation to the high-dimensional representation of the first language term to generate a transformed representation, wherein applying the transformation to the high-dimensional representation of the first language term comprises applying the transformation in accordance with trained values of a set of parameters, the trained values of the set of parameters having been determined through applying a machine learning training procedure on training terms in the first language and a respective translation of each of the training terms into the second language;
    selecting, from the high-dimensional representations of the terms in the vocabulary of terms in the second language, a closest high-dimensional representation to the transformed representation; and
    selecting the term in the second language that is associated with the closest high-dimensional representation as the translation into the second language of the first language term.

2. The method of claim 1, wherein selecting the closest high-dimensional representation to the transformed representation comprises selecting a high-dimensional representation having a largest cosine similarity value with the transformed representation.

3. The method of claim 2, further comprising:
  determining a confidence score for the translation of the first language term from the largest cosine similarity value; and
  determining that the translation of the first language term into the second language is valid when the confidence score exceeds a threshold value.

4. The method of claim 1, wherein the transformed representation z satisfies z=Wx, wherein W is a matrix of the trained values of the set of parameters and wherein x is the high-dimensional representation of the first language term.

5. The method of claim 1, further comprising:
  determining the trained values of the set of parameters from initial values of the set of parameters.

6. The method of claim 5, wherein determining the trained values comprises:
  selecting the training terms from the vocabulary of terms in the first language;
  obtaining the respective translation into the second language of each of the training terms from a translation service; and
  performing multiple iterations of the machine learning training procedure to determine the trained values using the training terms and the translations of the training terms as training data.

7. The method of claim 6, wherein performing multiple iterations of the machine learning training procedure comprises performing multiple iterations of the machine learning training procedure to determine a matrix of values W that satisfies:

$$\min_{W} \sum_{i=1}^{n} \|Wx_i - z_i\|^2,$$

wherein n is the total number of training terms, $x_i$ is the high-dimensional representation of an i-th training term, and $z_i$ is the high-dimensional representation of the translation of the i-th training term.

8. The method of claim 6, wherein the machine learning training procedure is stochastic gradient descent.

9. The method of claim 6, wherein selecting the plurality of training terms from the vocabulary of terms in the first language comprises selecting a pre-determined number of most frequently occurring terms from the vocabulary of terms in the first language.

10. The method of claim 1, further comprising:
   determining a distance between the high-dimensional representation of the selected translation and a high-dimensional representation of an existing translation into the second language of the first language term; and
   determining that the existing translation is likely correct or likely incorrect based on the distance.

11. The method of claim 10, wherein the distance is a cosine similarity and wherein determining that the existing translation is likely correct or likely incorrect comprises:
   determining that the existing translation is likely correct when the cosine similarity exceeds a threshold; and
   determining that the existing translation is likely incorrect when the cosine similarity does not exceed the threshold.

12. A system comprising one or more computers and one or more storage devices storing instructions that when executed by the one or more computers cause the one or more computers to perform operations comprising:
   maintaining data that associates each term in a vocabulary of terms in a first language with a respective high-dimensional representation of the term, wherein the high-dimensional representation of the term is a numeric representation of the term in a high-dimensional space, and wherein positions of high-dimensional representations of terms from the vocabulary of terms in the first language in the high-dimensional space reflect syntactic similarities, semantic similarities, or both between the terms from the vocabulary of terms in the first language;
   maintaining data that associates each term in a vocabulary of terms in a second language with a respective high-dimensional representation of the term, wherein the high-dimensional representation of the term is a numeric representation of the term in the high-dimensional space, and wherein positions of high-dimensional representations of terms from the vocabulary of terms in the second language in the high-dimensional space reflect syntactic similarities, semantic similarities, or both between the terms from the vocabulary of terms in the second language;
   receiving a first language term, wherein the first language term is a term from the vocabulary of terms in the first language; and
   determining a translation into the second language of the first language term from the high-dimensional representation of the first language term and the high-dimensional representations of terms in the vocabulary of terms in the second language, wherein determining the translation into the second language of the first language term comprises:
      identifying a high-dimensional representation of the first language term;
      applying a transformation to the high-dimensional representation of the first language term to generate a transformed representation, wherein applying the transformation to the high-dimensional representation of the first language term comprises applying the transformation in accordance with trained values of a set of parameters, the trained values of the set of parameters having been determined through applying a machine learning training procedure on training terms in the first language and a respective translation of each of the training terms into the second language;
      selecting, from the high-dimensional representations of the terms in the vocabulary of terms in the second language, a closest high-dimensional representation to the transformed representation; and
      selecting the term in the second language that is associated with the closest high-dimensional representation as the translation into the second language of the first language term.

13. The system of claim 12, wherein selecting the closest high-dimensional representation to the transformed representation comprises selecting a high-dimensional representation having a largest cosine similarity value with the transformed representation.

14. The system of claim 13, the operations further comprising:
   determining a confidence score for the translation of the first language term from the largest cosine similarity value; and
   determining that the translation of the first language term into the second language is valid when the confidence score exceeds a threshold value.

15. The system of claim 12, wherein the transformed representation z satisfies $z=Wx$, wherein W is a matrix of the trained values of the set of parameters and wherein x is the high-dimensional representation of the first language term.

16. A computer program product encoded on one or more non-transitory storage media, the computer program product comprising instructions that when executed by one or more computers cause the one or more computers to perform operations comprising:
   maintaining data that associates each term in a vocabulary of terms in a first language with a respective high-dimensional representation of the term, wherein the high-dimensional representation of the term is a numeric representation of the term in a high-dimensional space, and wherein positions of high-dimensional representations of terms from the vocabulary of terms in the first language in the high-dimensional space reflect syntactic similarities, semantic similarities, or both between the terms from the vocabulary of terms in the first language;
   maintaining data that associates each term in a vocabulary of terms in a second language with a respective high-dimensional representation of the term, wherein the high-dimensional representation of the term is a numeric representation of the term in the high-dimensional space, and wherein positions of high-dimensional representations of terms from the vocabulary of terms in the second language in the high-dimensional space reflect syntactic similarities, semantic similarities, or both between the terms from the vocabulary of terms in the second language;
   receiving a first language term, wherein the first language term is a term from the vocabulary of terms in the first language; and
   determining a translation into the second language of the first language term from the high-dimensional representation of the first language term and the high-dimensional representations of terms in the vocabulary of terms in the second language, wherein determining the translation into the second language of the first language term comprises:

identifying a high-dimensional representation of the first language term;

applying a transformation to the high-dimensional representation of the first language term to generate a transformed representation, wherein applying the transformation to the high-dimensional representation of the first language term comprises applying the transformation in accordance with trained values of a set of parameters, the trained values of the set of parameters having been determined through applying a machine learning training procedure on training terms in the first language and a respective translation of each of the training terms into the second language;

selecting, from the high-dimensional representations of the terms in the vocabulary of terms in the second language, a closest high-dimensional representation to the transformed representation; and selecting the term in the second language that is associated with the closest high-dimensional representation as the translation into the second language of the first language term.

* * * * *